(12) United States Patent
Smith

(10) Patent No.: US 6,503,449 B1
(45) Date of Patent: Jan. 7, 2003

(54) PROCESS FOR THE CONTROL OF MICROBIAL CONTAMINATION IN WATER-BASED SOLIDS SUSPENSIONS

(75) Inventor: Derek Stewart Hunter Smith, Johnstone (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/806,365

(22) PCT Filed: Oct. 14, 1999

(86) PCT No.: PCT/EP99/07715

§ 371 (c)(1),
(2), (4) Date: Mar. 29, 2001

(87) PCT Pub. No.: WO00/24679

PCT Pub. Date: May 4, 2000

(30) Foreign Application Priority Data

Oct. 24, 1998 (GB) ............................................. 9823247

(51) Int. Cl.$^7$ .............................. A61L 2/00; A61L 9/00; A01N 25/00
(52) U.S. Cl. ............................. 422/20; 422/22; 422/28; 424/405
(58) Field of Search .............................. 422/20, 22, 28; 424/405

(56) References Cited

U.S. PATENT DOCUMENTS

| 3,282,775 | A | * | 11/1966 | Stonehill | ..................... 167/22 |
|---|---|---|---|---|---|
| 3,578,499 | A | * | 5/1971 | Crotty et al. | ................... 134/4 |
| 5,284,844 | A | | 2/1994 | Lorenz et al. | ........... 514/222.5 |
| 5,637,307 | A | * | 6/1997 | Simmons et al. | ............. 422/20 |

FOREIGN PATENT DOCUMENTS

| DE | 263 499 | 1/1989 |
|---|---|---|
| EP | 0 306 294 | 3/1989 |
| EP | 0 327 206 | 8/1989 |
| EP | 0 363 316 | 9/1989 |
| EP | 0 385 801 | 9/1990 |
| EP | 0 393 948 | 10/1990 |
| EP | 0 537 595 | 10/1992 |
| EP | 0 706 759 | 4/1996 |

OTHER PUBLICATIONS

Derw. Abst. 93–118488 (DE 4,133,210—Apr. 8, 1993 which is the equivalent of EP 537,595—Apr. 21, 1993).

Derw. Abst. 89–166065[23] (DD 263,449—Jan. 4, 1989).

* cited by examiner

Primary Examiner—Robert J. Warden, Sr.
Assistant Examiner—Imad Soubra
(74) Attorney, Agent, or Firm—Kevin T. Mansfield

(57) ABSTRACT

The present invention relates to a process for the elimination of microbial contamination from water-based suspensions of solid particles, especially organic and inorganic pigment dispersions, and the colourant formulations containing such suspensions.

15 Claims, No Drawings

PROCESS FOR THE CONTROL OF MICROBIAL CONTAMINATION IN WATER-BASED SOLIDS SUSPENSIONS

The present invention relates to a process for the elimination of microbial contamination from water-based suspensions of solid particles, especially organic and inorganic pigment dispersions, and the colourant formulations containing such suspensions.

Microbial organisms, especially bacteria, yeasts and fungi, are present in all aspects of the environment and are capable of existing under the most extreme conditions. Spore-forming organisms can exist in a dormant state for many years, ready to come into growth when the environment is friendly. Others will exist when the moisture content of the environment is sufficient to sustain growth. All are capable of metabolising organic substrates as sources of nutrient.

Microbial spoilage in the food industry is well known and extreme measures are typically employed for its elimination and prevention. For example, heat treatment, often under pressure (autoclaving), and gamma irradiation can be used to achieve decontamination.

Systems that are water-based and contain compounds of carbon, nitrogen, oxygen and sulphur are ideal breeding grounds for microbial organisms. The subsequent manifestations for such contamination can be mal odours, mycelial mats, settling of the solids in paints (due to digestion of the thickeners), blocking of filtration systems, and the like. As legislation and environmental pressures on volatile organic compounds (VOC's) increase, an increasing number of systems such as, for example, paints, printing inks and the like are converting from solvent-based to water-based formulations.

Most of the colour in every-day life derives from organic or inorganic pigments. These are very small particles (ranging from a few nanometres to several hundreds of microns in size) which are dispersed in synthetic or natural substrates (inks, paints, fibres, cosmetics and the like), and those in turn, are susceptible to microbial attack. The conventional methods for resisting such attacks have been to add chemical biocides to the formulations. These biocides are toxic to the micro-organisms, and either kill, or put the microorganisms into a condition of stasis. These chemical biocides, by their very natures, can be toxic to humans, causing secondary effects such as skin sensitisation, and are themselves becoming subject to increasing legislation and restriction in use. Furthermore, as the most effective chemical biocides can be adversely affected by the typical conditions of industrial processing (heat, pH, amines, thiols, and the like), even higher biocide levels are then required to overcome these factors. When solid particles are present in the medium the biocides can be adsorbed on the surface of the particles which can also have a negative effect on their efficacy.

Aqueous pigment dispersions and the formulations they colour are by their very nature unsuited to any degree of heat treatment because of both the cloud points of the additives which they contain, and because of gamma irradiation due to the susceptibility of the chemical chromophore to high-energy breakdown, and, as such, aqueous pigment dispersions are normally dependent on chemical biocides. Pigment powders, because of their very small particle size (measured in nanometres), high surface area and propensity to adsorb moisture, can carry varying levels of microbial contamination either in the vegetative or dormant states. When such pigment dispersions are dispersed into water containing organic surface-active agents the environment becomes conducive to the active propagation of microbial contaminants, particularly in the warmer climates, in warehouses, the holds of ships, and other typical storage conditions. Contamination levels of up to $10^8$ colony-forming units per millilitre can typically be reached. To counter this, chemical biocides are normally added in sufficient levels to minimise the growth of contaminants, and if not consumed, remain present as potentially toxic substances in the application system. This presents a dilemma to the manufacturer as products containing more than a specified amount of a particular biocide must carry a warning label identifying the product as toxic (for example:—R43—Skin Sensitiser) even when the main product itself is not toxic. Thus, it would be a significant technical advantage to develop a process for the production of water-based suspensions of solid particles that are free of microbial contamination at the point of manufacture; during and after storage; in final formulation with additional materials. It would be a further advantage to develop such a process wherein the levels of chemical agent (biocide) employed are below the regulatory labelling level while still being sufficient to control microbial growth.

The present invention relates to a process using ultrasound in conjunction with very low levels of chemical biocide for the control of biological activity from suspensions of solid particles in water-based fluids, especially pigment and dye colourants. The process according to the present invention allows for a significant reduction in the processing time for control of biological activity at biocide levels well within regulatory labelling limits, and provides a more effective and efficient throughput of pigmented material. Furthermore the present invention additionally provides means for further improvements in process efficiency by careful selection of chemical biocide to suit the components in any particular coloured aqueous formulation.

Accordingly, the present invention provides a process for the production of biologically inactive dispersions of coloured particles in aqueous formulations at ambient temperatures when the level of contamination is as high as $10^9$ colony-forming units per millilitre via ultrasonic treatment of a mixture of the solids dispersion and chemical biocide.

Water-based solids suspensions suitable for use in the process according to the present invention include dispersions of organic and inorganic pigments and dyestuffs in water containing additives that enhance processing and applicational properties. Examples of such additives are ethoxylated fatty alcohols and phenols, sulphonated naphthalenes and their derivatives, acrylic acid polymers and copolymers with styrene, both water-soluble and emulsion. The term "solid" as defined herein includes particles of pigments and dyes where the particle can be an individual crystal, aggregate of crystals or agglomerate of aggregates ranging in size from a few nanometres to hundreds of microns together with additives which themselves are solutions or emulsions in water. Any level of solid may be employed in the suspensions. However, at very high solids contents, typically greater than about 65%, highly viscous materials are typically formed which, although usable in the present process, provide specific difficulties in the manufacturing process due to pumping limitations. Similarly, highly diluted suspensions, typically containing solids at levels of less than about 5%, may be processed (pumped) more easily but their low solids content can limit their utility for economic reasons. Thus solids suspensions containing from 10% to 80% of solids, preferably 20% to 60% by weight of the dispersion are preferred for use in the process of the present invention.

Any level of chemical biocide may be employed in the dispersions/formulations to be processed according to the present invention. Preferably the total level of chemical biocide used is lower than the level requiring an R43 skin sensitising label. Typically the chemcial biocide is present at levels of from about 5 parts per million (ppm) by weight of the dispersion to about 500 ppm, most preferably from about 50 ppm to about 250 ppm by weight of the dispersion/formulation.

Chemical biocide as defined herein means a material which is capable of inhibiting the growth of microbiological contaminants in water-based systems. Examples of microbiological contaminants as defined herein include Gram positive and Gram negative bacteria, yeasts and fungi. Suitable chemical biocides include aldehydes and isothiazolones.

As stated hereinbefore, the process of the before present invention can be used to treat both simple solids dispersions as defined herein and final dispersed formulations. A simple solids dispersion as defined herein comprises pigment or dye colourant, biocide water and optional additive materials. Optional additives suitable for use herein include ethoxylated fatty alcohols or phenols, sulphonated naphthalenes and naphthalene derivatives, polymers such as those derived from acrylic acid or its derivatives, styrene/acrylic acid mixtures and such like. The level of optional additive employed is from about 2% to 200% of colourant weight. A final dispersed formulation as defined herein means the colourants dispersion and optional additives as hereinbefore described in combination with ,for example, JONCRYL 61 (RTM) (35% solids), JONCRYL 77 (RTM) (45% solids), PE wax (JONWAX, RTM), all available from Johnson & Johnson, diethylene glycol monoethyl ether, antifoam(such as tributyl phosphate) and water.

Final dispersed formulations include inks, paints, textile dyes and the like.

Any chemical biocide capable of inhibiting the growth of either or all of Gram positive or Gram negative bacteria, yeasts or fungi may be employed in the process according to the present invention. Suitable chemical biocides include aldehydes such as formaldehyde, dialdehydes such as pentane-1,5-dialdehyde, substituted and unsubstituted isothiazolin-3-one, N-octylisothiazolin-3-one or 1,2-benzisothiazolin-3-one, hexahydro-1,3,5-tris-(2-hydroxyethyl)-s-triazine, tetrakishydroxymethylphosphonium sulphate, dimethyl-N-alkylbenzammonium chloride, mono or dialcohol (either alkyl or aryl), thiocyanomethylthiobenzisothiazolone, and mixtures thereof. It is our experience that the efficiency of a particular biocide is closely associated with the colourant chemical type. It should be understood that within the range of chemical biocides available some will be more effective than others with any particular solids dispersion.

Preferred chemical biocides for use herein are pentane-1,5-dialdehyde, methylisothiazolin-3-one and its 5-chloro derivative for the control of bacteria and yeasts, and N-octylisothiazolin-3-one for the control of fungi.

Ultrasound as defined herein means sound waves beyond the response of the human ear, notably 16 kHz or greater. Being a sound wave, ultrasound can be transmitted through any substance, solid, liquid or gas, which posses elastic properties. The movement of the vibrating body (the sound source) is communicated to the molecules of the substrate medium, each of which transmits the motion to an adjoining molecule before returning approximately to its original position. Besides the variation in the molecules' position when the sound wave travels through the medium there is a variation in pressure. At the point where the layers of molecules are crowded together(such as when the molecules are compressed) the pressure is higher than normal at that instant, whereas in the region where the layers are furthest apart (the rarefaction region) the pressure is lower than normal. If a sufficiently large negative pressure is applied to a liquid(here it will be the acoustic pressure on rarefaction), such that the average distance between the molecules exceeds the critical molecular distance necessary to hold the liquid intact, the liquid will break down and voids or cavities will be created. These voids or cavities are known as cavitation bubbles. The production of such cavitation bubbles has been known for many years, and good examples are provided by either a ship's propeller or a paddle stirrer where the cavities are produced by the rapid rotation of the blade through the liquid. Once produced, these cavities or bubbles may grow in size until the maximum negative pressure has been reached. In the succeeding compression of the wave, however, they will be forced to contract, i.e. decrease in volume and some of them may even totally disappear. The shock waves produced on total collapse of the bubbles has been estimated to be of the order of several thousands of atmospheres, and are believed to be the cause of the considerable erosion observed for components in the vicinity of the bubble.

To completely rupture a liquid and hence produce a void or cavity requires a finite time. For sound waves with high frequencies, the time required to create the bubble may be longer than that available during the rarefaction cycle. (For example, at 20 kHz the rarefaction cycle lasts 25 microseconds(=0.5×frequency), attaining its maximum negative pressure in 12.5 microseconds, whereas at 20 Mhz the rarefaction cycle lasts only 0.025 microseconds. Thus it might be anticipated that as the frequency increases, the production of cavitation bubbles may become more difficult to achieve in the available time, and that greater sound intensities(i.e. greater amplitudes) would need to be employed (over these short periods) to ensure that the cohesive forces of the liquid are overcome. Since it is necessary for the negative pressure in the rarefaction cycle to overcome the natural cohesive forces acting in the liquid, any increase in viscosity will increase the threshold of cavitation.

Ultrasound on its own is known to de-nature the cell wall of certain microorganisms and release the contents of the cell in a still viable condition. With increasing temperature ultrasound may be capable of killing the more susceptible organisms. We have found that even in pH conditions which cause biocide degradation, and at lower temperatures, no detectable viable growth of bacteria, yeasts or fungi occurs after sonication in the presence of low levels of biocide ("sonication" herein meaning the passing of ultrasonic waves through the medium).

Where such systems are alkaline (that is, pH>7.0), the most efficient chemical biocides are often unstable and rapidly degraded. While not wishing to be bound to any particular theory it is thought that the combination of ultrasound with these biocides in such systems accelerates the rate of microbial decontamination above that of biocide degradation, and as such allows lower dosages of chemical biocide to be used for a given level of microbial contamination. In particular, biological activity can be reduced to an undetectable level from surfactant- and resin-based aqueous coloured formulations in a single-pass operation at ambient temperature.

A transducer is a device capable of converting one form of energy into another, a simple example being a loudspeaker which converts electrical to sound energy. Ultrasonic transducers are designed to convert either mechanical or electrical energy into high frequency sound. Ultrasonic transducers which may be employed in the process of the current invention include electrochemical transducers and magnetostrictive transducers.

Electrochemical transducers are based on either the piezoelectric or the magnetostrictive effect. Piezoelectric transducers utilise the piezoelectric effect of certain crystals such as quartz. On applying rapidly reversing charges to a piezoelectric material, fluctuations will be produced. This effect can be harnessed to transmit ultrasonic vibrations from the crystal through whatever medium it might be in, although it is not possible to drive a given piece of piezoelectric crystal efficiently at every frequency. Optimum performance will only be obtained at the natural resonance frequency of the particular sample, and this depends upon its dimensions. This is why the conventional sonochemistry equipment is of fixed frequency and why reports of comparative studies at different frequencies are uncommon. The use of different types of piezoelectric materials permits the building of ultrasonic generators of different powers and frequencies.

Magnetostrictive transducers rely on a change in the dimension of a suitable ferromagnetic material such as nickel or iron, by the application of a magnetic field. It is usually in the form of a rod(or bar) acting as the magnetic core within a solenoid. Applying a varying current to the coil produces a variation in the dimensions of the bar.

In industrial production situations the type of process will govern the choice of reactor design, whether it is batch or continuous flow-through. High intensity systems may employ a number of probes, but more effective is an acoustic chamber formed by two sonicated metal plates which enclose a flow system such as a Nearfield Accoustical Processor. These plates face towards each other and are separated by a small distance, typically a few millimetres to several centimetres, depending on the rheology of the fluid. Under these conditions any fluid flowing between these plates is subject to an ultrasonic intensity greater than that expected from simple doubling of a single plate intensity. Furthermore, if the two frequencies are slightly different from each other then turbulence is set up in the fluid which gives very efficient mixing, particularly in the case of slurries, thereby eliminating the need for stirring and improving the sonication of the medium. An additional benefit of the Nearfield Accoustical Processor ultrasonic equipment is that with vibrating plates the system can be built to any size and can cope with very large throughputs of material. This same concept can be achieved by coupling numbers of probes into a pipe by means of 'T' sections, or the immersion of a submersible transducer inside a pipe itself.

During the propagation of a plane sound wave through a medium the intensity of the wave decreases as the distance from the ultrasonic radiation source increases. This attenuation may rise as a result of reflection, refreaction, diffraction or scattering of the wave or it may be the result of converting some of the mechanical(kinetic) energy of the wave into heat. As the molecules of the medium vibrate under the action of the sound wave, they can experience viscous interactions which degrade the acoustic energy into heat, and it is this degraded acoustic energy by the medium which gives rise to the small observed bulk heating effect during the application of high power ultrasound.

Since it is necessary for the negative pressure in the rarefaction cycle to overcome the natural cohesive forces acting in the liquid, any increases in these forces, such as an increase in viscosity, will increase the threshold of cavitation. It is therefore advantageous to alter the distance between the accoustical plates to suit the rheoiogy(flow characteristics) of the medium, or the amplitude(power) of the accoustical processor if temperature rise is not an issue.

Preferred for use herein is the Nearfield Accoustical Processor ultrasound equipment, and in particular the NAP-3606-HP Ultrasonic Reactor available from Advanced Sonic Processing Systems, 324 Christian Street, Oxford, Conn. 06478, USA. For the effective sonolation treatment of water-borne solids suspensions containing up to 70% solids and from 15 ppm chemical biocide it has been found that the frequencies in the range of from 16 kHz to 20 kHz; electrical power consumption of up to 4000 watts and a diaphragm plate spacing of from 3 millimetres to 50 millimetres are sufficient to eliminate microbial contamination at levels of up to $10^8$ colony-forming units per millilitre (cfu/ml) with a flow rate up to 3 metric tonnes per hour.

Utility of alternative sonolation equipment as specified herein before will require adjustment of the requisite frequency, chamber volume and residence time in order to define the optimal conditions for effective contaminant treatment. Such adjustment and analysis is within the remit of the skilled operator.

The following non-limiting Examples further illustrate the present invention:

EXAMPLE 1

Removal of bacterial activity from a water-based organic pigment dispersion containing fatty alcohol ethoxylate and defoamer A mixture of Pigment Red 23, available from Ciba Specialty Chemicals(UK) Ltd., 215.5 parts, Emulan OG (RTM) (35% solution in water), available from BASF, 153.7 parts, tributyl phosphate, available from Albright & Wilson, 2 parts, and water, 128.8 parts, are dispersed by re-circulation through a Bachofen KDL200 bead-mill until colouristic properties are within specification of UNISPERSE (RTM) Red RBS-PI, available from Ciba Specialty Chemicals(UK) Ltd., and adjusted to pH 8.0–8.5 with 20% sodium hydroxide solution. This material is identified as containing the Gram negative bacterium, *Pseudomonas putida*. 50 millilitre aliquots of this dispersion containing levels of glutaraldehyde (pentane-1,5-dialdehyde), available as the trade product Protectol GDA form BASF or Ucarcide from Union Carbide, between 0 parts per million (ppm) and 2000 ppm are sonicated using a Branson MSE sonicator with a 19 mm horn probe resonating at 20 kHz with an amplitude of 6 microns. Sonication is undertaken in a 100 millilitre glass beaker, diameter 38 mm, with magnetic flea agitator and cooled in a water/ice bath to maintain temperature at 28–32° C. Bacterial growth in each sample is assessed at 5 minute intervals by streaking each dispersion on to Nutrient Agar(NA) plates and incubating the plates for a minimum of 48 hours at 30° C. The plates are then examined for bacterial colonies and expressed according to the following notation:

| | |
|---|---|
| − | no bacterial colonies detected |
| + | light contamination ($10^0$ and $10^3$ cfu/ml) |
| ++ | moderate contamination($10^3$–$10^5$ cfu/ml) |
| +++ | heavy contamination($>10^5$ cfu/ml) |

Results were as follows:

TABLE 1

| Time mins. | 0 ppm | 10 ppm | 25 ppm | 50 ppm | 75 ppm | 100 ppm | 150 ppm | 500 ppm | 1000 ppm | 2000 ppm |
|---|---|---|---|---|---|---|---|---|---|---|
| 0 | +++ | +++ | +++ | +++ | +++ | +++ | +++ | +++ | +++ | +++ |
| 5 | +++ | +++ | ++ | ++ | – | + | – | – | – | – |
| 10 | +++ | +++ | – | – | – | + | – | – | – | – |
| 15 | +++ | ++ | – | ++ | – | – | – | – | – | – |
| 20 | +++ | + | – | – | – | – | – | – | – | – |
| 25 | ++ | + | – | – | – | – | – | – | – | – |
| 30 | + | – | – | – | – | – | – | – | – | – |

Table 1 illustrates the speed and efficiency of the sonocation process according to the present invention for the elimination of bacterial growth.

The resistance of the pigment dispersion produced according to the process of the invention to further bacterial growth is recorded by continued observation of the samples of Table 1 over a period of up to 90 days. The results of these observations are shown in Table 2.

TABLE 2

| Time | 0 ppm | 10 ppm | 25 ppm | 50 ppm | 75 ppm | 100 ppm | 150 ppm | 500 ppm | 1000 ppm | 2000 ppm |
|---|---|---|---|---|---|---|---|---|---|---|
| 1 | +++ | – | – | – | – | – | – | – | – | – |
| 2 | +++ | – | – | – | – | – | – | – | – | – |
| 3 | +++ | – | – | – | – | – | – | – | – | – |
| 7 | +++ | – | – | – | – | – | – | – | – | – |
| 14 | +++ | – | – | – | – | – | – | – | – | – |
| 28 | +++ | – | – | – | – | – | – | – | – | – |
| 90 | +++ | – | – | – | – | – | – | – | – | – |

EXAMPLE 2

Removal of bacterial activity from a water-based organic pigment dispersion containing fatty alcohol ethoxylate and defoamer.

A mixture of Pigment Red 23,215.5 parts, Emulan OG (RTM) (35% solution in water), 153.7 parts, tributyl phosphate, 2 parts, and water, 128.8 parts are dispersed by re-circulation through a Bachofen KDL200 bead-mill until colouristic properties are within specification of UNISPERSE (RTM) Red RBS-PI as detailed in Example 1 and adjusted to pH 8.0–8.5 with 20% sodium hydroxide solution. This material is identified as having a bacterial count of 4.8×10$^6$ colony-forming units (cfu) per millilitre comprised of a mixture of Gram positive and Gram negative bacteria. It is treated with 250 parts per million(ppm) of pentane 1,5-dialdehyde and pumped through a 2406 Nearfield Accoustical Processor sonicating at 16 kHz and 20 kHz respectively with a plate separation of 6 mm (approximately) at a flow rate of 750 kg/hr. Assessment bacterial activity is then done by spreading a sample of the pigment dispersion on Nutrient Agar(NA) plates and incubating at 30° C. for 48 hours. After one pass through the sonicator no Gram negative organisms are evident; after four passes no Gram positive organisms are found. The temperature rise is 1° C. per pass, from a starting value of 20° C.

It is found that organism elimination proceeds more rapidly the higher the temperature, and that the concentration of biocide necessary is dependent on the chemical nature of the biocide and the level and type of microbiological contamination present in the product.

EXAMPLE 3

The solids dispersion as defined in Example 1 is treated with a mixture of 5-chloroiso-thiazolin-3-one (CIT) and methylisothiazolin-3-one (MIT), available as the trade product Acticide LG (RTM) from Thor Chemicals, between 25 ppm and 500 ppm according to the process defined in Example 1. Results are as follows:

TABLE 3

| Time (mins.) | 25 ppm | 100 ppm | 150 ppm | 250 ppm | 500 ppm |
|---|---|---|---|---|---|
| 0 | +++ | +++ | +++ | +++ | +++ |
| 5 | +++ | +++ | + | + | – |
| 10 | +++ | +++ | – | – | – |
| 15 | +++ | +++ | ++ | – | – |
| 20 | +++ | +++ | + | – | – |
| 25 | +++ | + | – | – | – |
| 30 | +++ | 19 colonies | – | – | – |
| 35 | +++ | 11 colonies | – | – | – |
| 40 | +++ | 5 colonies | – | – | – |
| 45 | +++ | 1 colony | – | – | – |
| 50 | +++ | – | – | – | – |
| 55 | +++ | – | – | – | – |
| 60 | +++ | – | – | – | – |
| days after sonication | | | | | |
| 1 | +++ | – | – | – | – |
| 3 | +++ | – | – | – | – |
| 7 | +++ | – | – | – | – |
| 14 | ++ | – | – | – | – |
| 28 | + | – | – | – | – |
| 90 | +++ | – | – | – | – |

EXAMPLE 4

The solids dispersion as defined in Example 2, containing the mixture of Gram positive and Gram negative bacteria, is treated separately with 200 ppm and 500 ppm of pentane-1,5-dialdeyde (Ucarcide 250 (RTM)), and with 200 ppm and 500 ppm of CIT/MIT mixture (Acticide LG (RTM)) and each sonicated for a period of 30 minutes according to the process defined in Example 1. Each sample is then checked for bacterial contamination over following 28 days.

TABLE 4

| | Ucarcide 250 (RTM) | | Acticide LG (RTM) | |
|---|---|---|---|---|
| Time mins. | 200 ppm | 500 ppm | 200 ppm | 500 ppm |
| 0 | +++ | +++ | +++ | +++ |
| 5 | ++ | – | +++ | +++ |
| 10 | – | – | +++ | +++ |
| 15 | – | – | +++ | +++ |
| 20 | – | – | +++ | +++ |
| 25 | – | – | +++ | ++ |
| 30 | – | – | ++ | ++ |
| days after sonication | | | | |
| 1 | – | – | – | – |
| 2 | – | – | ++ | ++ |
| 7 | – | – | +++[1] | +++[2] |
| 14 | – | – | ++ | ++ |
| 28 | – | – | ++ | ++ |

[1]=Gram +ve and Gram –ve bacteria present
[2]=Gram +ve bacteria only present

EXAMPLE 5

A mixture of Pigment Red 53.1, available from S&D Chemicals Ltd., 37 parts, Emulan OG (35% solution), 25.9 parts, 2-ethylhexanoic acid, available from Barratt Chemicals Ltd., 3 parts tributyl phosphate, 0.3 parts, and water 31.74 parts are dispersed by a single pass through a Bachofen KDL Special beadmill containing 1.0 mm Yttrium-stabilised Zirconium Oxide beads. This material is identified as containing the Gram negative bacteria, Xanthomonas maltophilia and Pseudomonas mendocina. 50 millilitre aliquots of this dispersion are treated with pentane-1, 5-dialdehyde (Ucarcide 250) and CIT/MIT mixture (Acticide LG) according to the process defined in Example 1 and each sample checked for bacterial contamination according to the following table:

What is claimed is:

1. A process for the removal of microbiological contamination up to $10^9$ colony-forming units per millilitre from water-based solids suspensions and/or solutions comprising incorporation of a chemical biocide and ultrasonic irradiation of the suspension and/or solution, wherein the biocide is present at a level of from about 5 parts per million to about 500 parts per million of the water-based liquid being treated.

2. A process according to claim 1 wherein the biocide is selected from an aldehyde, dialdehyde, substituted isothiazolin-3-one,N-octylisothiazolin-3-one or 1,2-benzisothiazolin-3-one, hexahydro-1,3,5-tris-(2-hydroxhethyl)-s-triazine, tetrakishydroxymethylphosphonium sulphate,dimethyl-N-alkylbenzammonium chloride, mono or dialcohol(either alkyl or aryl), thiocyanomethylthiobenzisothiazolone and mixtures thereof.

3. A process according to claim 1 wherein the frequency of ultrasound is between 16 kHz and 100 kHz.

4. A process for the reduction or elimination of bacterial activity or contamination according to claim 1, wherein the water-based solids suspension and/or solution is a water-based paint formulation.

5. A process for the reduction or elimination of bacterial activity or contamination according to claim 1, wherein the water-based solids suspension and/or solution is a water-based ink formulation.

6. A process for the reduction or elimination of bacterial activity or contamination according to claim 1, wherein the water-based solids suspension and/or solution is a water-based textile dye formulation.

7. A process according to claim 1 wherein the biocide is selected from an aldehyde, dialdehyde, substituted isothiazolin-3-one,N-octylisothiazolin-3-one or 1,2-benzisothiazolin-3-one,hexahydro-1,3,5-tris-(2-hydroxhethyl)-s-triazine, tetrakishydroxymethylphosphonium sulphate,dimethyl-N-alkylbenzammonium chloride, mono or dialcohol(either alkyl or aryl), thiocyanomethylthiobenzisothiazolone and mixtures thereof.

8. A process according to claim 1 wherein the frequency of ultrasound is between 16 kHz and 100 kHz.

TABLE 5

| Time (mins.) | 500 ppm Ucarcide 250 | 750 ppm Ucarcide 250 | 1000 ppm Ucarcide 250 | 1500 ppm Ucarcide 250 | 100 ppm Acticide LG | 500 ppm Acticide LG |
|---|---|---|---|---|---|---|
| 0 | +++ | +++ | +++ | +++ | +++ | +++ |
| 5 | +++ | +++ | +++ | +++ | +++ | – |
| 10 | +++ | +++ | +++ | +++ | +++ | – |
| 15 | +++ | +++ | +++ | +++ | +++ | – |
| 20 | +++ | +++ | ++ | ++ | +++ | – |
| 25 | +++ | +++ | ++ | + | +++ | – |
| 30 | ++ | ++ | + | + | ++ | – |
| 35 | ++ | ++ | + | + | ++ | – |
| 40 | ++ | ++ | + | + | ++ | – |
| 45 | ++ | ++ | + | + | + | – |
| 50 | ++ | + | + | + | + | – |
| 55 | + | + | + | + | + | – |
| 60 | + | + | + | + | + | – |
| days after sonication | | | | | | |
| 3 | +++ | +++ | +++ | +++ | – | – |
| 7 | +++ | +++ | +++ | +++ | – | – |
| 14 | +++ | +++ | +++ | +++ | – | – |
| 28 | +++ | +++ | +++ | +++ | – | – |
| 90 | +++ | +++ | +++ | +++ | – | – |

9. A process according to claim 1 wherein the frequency of ultrasound is between 16 kHz to 35 kHz.

10. A process according to claim 1 wherein the frequency of ultrasound is between 16 kHz to 20 kHz.

11. A process according to claim 1 wherein the frequency of ultrasound is between 16 kHz to 35 kHz.

12. A process according to claim 1 wherein the frequency of ultrasound is between 16 kHz to 20 kHz.

13. A process for the removal of microbiological contamination up to $10^9$ colony-forming units per millilitre from water-based solids suspensions and/or solutions containing a pigment or dye colorant, comprising incorporation of a chemical biocide and ultrasonic irradiation of the resulting suspension and/or solution, wherein the biocide is present at a level of from about 5 parts per million to about 500 parts per million of the water-based liquid being treated.

14. A process for the reduction or elimination of bacterial activity or contamination according to claim 1 which is carried out at ambient temperatures.

15. A process for the reduction or elimination of bacterial activity or contamination according to claim 1, wherein the biocide is present at a level of from about 50 parts per million to about 250 parts per million of the water-based liquid being treated.

\* \* \* \* \*